United States Patent
Li et al.

(10) Patent No.: US 11,263,080 B2
(45) Date of Patent: Mar. 1, 2022

(54) METHOD, APPARATUS AND COMPUTER PROGRAM PRODUCT FOR MANAGING CACHE

(71) Applicant: EMC IP Holding Company LLC, Hopkinton, MA (US)

(72) Inventors: Xiongcheng Li, Beijing (CN); Jibing Dong, Beijing (CN); Hongpo Gao, Beijing (CN); Jianbin Kang, Beijing (CN); Xinlei Xu, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 453 days.

(21) Appl. No.: 16/445,990

(22) Filed: Jun. 19, 2019

(65) Prior Publication Data
US 2020/0026647 A1 Jan. 23, 2020

(30) Foreign Application Priority Data
Jul. 20, 2018 (CN) .......................... 201810801996.4

(51) Int. Cl.
| | |
|---|---|
| *G06F 11/00* | (2006.01) |
| *G06F 11/10* | (2006.01) |
| *G06F 12/0804* | (2016.01) |
| *G06F 11/07* | (2006.01) |
| *G06F 12/0897* | (2016.01) |
| *G06F 3/06* | (2006.01) |

(52) U.S. Cl.
CPC ........ *G06F 11/1092* (2013.01); *G06F 3/0614* (2013.01); *G06F 3/0664* (2013.01); *G06F 11/073* (2013.01); *G06F 11/0751* (2013.01); *G06F 11/0793* (2013.01); *G06F 12/0804* (2013.01); *G06F 12/0897* (2013.01); *G06F 3/0644* (2013.01); *G06F 3/0689* (2013.01); *G06F 2212/1044* (2013.01)

(58) Field of Classification Search
CPC .............. G06F 11/073; G06F 11/0751; G06F 11/0793; G06F 11/1092
See application file for complete search history.

(56) References Cited

U.S. PATENT DOCUMENTS

| | | | |
|---|---|---|---|
| 7,631,155 | B1 | 12/2009 | Bono et al. |
| 7,818,535 | B1 | 10/2010 | Bono et al. |

(Continued)

*Primary Examiner* — Joshua P Lottich
(74) *Attorney, Agent, or Firm* — BainwoodHuang

(57) ABSTRACT

Techniques manage a cache. Such techniques involve creating a primary cache by a cache management module in a storage system. Such techniques further involve: in response to the primary cache being created, sending a first request to a hardware management module to obtain first information about a first virtual disk. Such techniques further involve: in response to receiving the first information from the hardware management module, creating a secondary cache using the first virtual disk. Such techniques further involve: in response to an available capacity of the primary cache being below a predetermined threshold, flushing at least one cache page in the primary cache to the secondary cache. In certain techniques, it is possible to use spare extents in the disk array to create the secondary cache to increase a total capacity of the cache in the system, thereby improving the access performance of the system.

23 Claims, 9 Drawing Sheets

(56) References Cited

U.S. PATENT DOCUMENTS

| | | | |
|---|---|---|---|
| 7,873,619 B1 | 1/2011 | Faibish et al. | |
| 8,095,577 B1 | 1/2012 | Faibish et al. | |
| 8,407,448 B1 | 3/2013 | Hayden et al. | |
| 9,256,381 B1 | 2/2016 | Fultz et al. | |
| 9,513,814 B1 | 12/2016 | Can et al. | |
| 9,514,014 B2 | 12/2016 | Webman et al. | |
| 9,846,544 B1 | 12/2017 | Bassov | |
| 9,875,043 B1 | 1/2018 | Suldhal | |
| 10,082,959 B1 | 9/2018 | Chen et al. | |
| 10,409,778 B1 | 9/2019 | Zhao et al. | |
| 10,691,354 B1 | 6/2020 | Kucherov | |
| 2003/0079100 A1* | 4/2003 | Williams | G06F 11/1435 711/165 |
| 2006/0069888 A1* | 3/2006 | Martinez | G06F 11/1458 711/162 |
| 2014/0201442 A1* | 7/2014 | Rajasekaran | G06F 12/0871 711/119 |
| 2015/0058683 A1* | 2/2015 | Venkata | G06F 11/073 714/53 |
| 2015/0135003 A1* | 5/2015 | Cota-Robles | G06F 12/0815 714/6.3 |
| 2015/0193311 A1* | 7/2015 | Provizor | G06F 11/1456 707/649 |
| 2018/0165208 A1* | 6/2018 | Farey | G06F 12/0868 |
| 2018/0285198 A1* | 10/2018 | Dantkale | G06F 12/0811 |
| 2019/0266062 A1* | 8/2019 | Borlick | G06F 11/1076 |

* cited by examiner

METHOD, APPARATUS AND COMPUTER PROGRAM PRODUCT FOR MANAGING CACHE

CROSS-REFERENCE TO RELATED APPLICATION

This application claims priority to Chinese Patent Application No. CN201810801996.4, on file at the China National Intellectual Property Administration (CNIPA), having a filing date of Jul. 20, 2018, and having "METHOD, APPARATUS AND COMPUTER PROGRAM PRODUCT FOR MANAGING CACHE" as a title, the contents and teachings of which are herein incorporated by reference in their entirety.

FIELD

Embodiments of the present disclosure generally relate to the field of data storage, and specifically to a method, an apparatus and a computer program product for managing cache.

BACKGROUND

A storage system usually has a plurality of disks. The disks can be divided into a group of disk extents (briefly called DE) of a fixed size. For the purpose of data redundancy backup and/or performance improvement, it is possible to use a plurality of disk extents to build a redundant array of independent disks (RAID). The RAID built based on disk extents of the disk but not the whole disk is also called "mapped RAID". To ensure reliability of the mapped RAID, some spare disk extents are usually reserved in the plurality of disks. When a certain disk in the plurality of disks fails, these spare disk extents can be used to rebuild a RAID strip associated with the failure, thereby avoiding occurrence of data loss. However, when the mapped RAID does not fail, these spare disk extents are normally not used.

In addition, to improve access performance of the storage system, there is usually a cache built using a disk (e.g., a flash memory, or a solid-state disk etc.) having a higher access speed in the storage system for caching data which is accessed frequently. However, the capacity of such cache is usually limited.

SUMMARY

Embodiments of the present disclosure provide a method, an apparatus and a computer program product for managing a cache.

According to a first aspect of the present disclosure, there is provided a method of managing a cache. The method includes creating a primary cache by a cache management module in a storage system. The method further includes: in response to the primary cache being created, sending a first request to a hardware management module in the storage system to obtain first information about a first virtual disk in the storage system. The storage system includes at least one physical disk having a plurality of extents, the plurality of extents include a first group of extents for creating a first disk array, and the first virtual disk is created by the hardware management module based on at least one spare extent from the first group of extents, the at least one spare extent from the first group of extents is reserved for rebuilding the first disk array. The method further includes: in response to receiving the first information from the hardware management module, creating a secondary cache using the first virtual disk. In addition, the method further includes: in response to an available capacity of the primary cache being below a predetermined threshold, flushing at least one cache page in the primary cache to the secondary cache.

According to a second aspect of the present disclosure, there is provided an apparatus for managing a cache. The apparatus includes at least one processing unit and at least one memory. The at least one memory is coupled to the at least one processing unit and has instructions stored thereon and executed by the at least one processing unit. The instructions, when executed by the at least one processing unit, causes the apparatus to perform acts, the acts including: creating a primary cache in a storage system; in response to the primary cache being created, sending a first request to a hardware management module in the storage system to obtain first information about a first virtual disk in the storage system, wherein the storage system includes at least one physical disk having a plurality of extents, the plurality of extents include a first group of extents for creating a first disk array, and the first virtual disk is created by the hardware management module based on at least one spare extent from the first group of extents, the at least one spare extent from the first group of extents is reserved for rebuilding the first disk array; in response to receiving the first information from the hardware management module, creating a secondary cache using the first virtual disk; and in response to an available capacity of the primary cache being below a predetermined threshold, flushing at least one cache page in the primary cache to the secondary cache.

According to a third aspect of the present disclosure, there is provided a computer program product that is tangibly stored on a non-transient computer readable medium and includes machine-executable instructions. The machine-executable instructions, when being executed by an apparatus, cause the apparatus to execute any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of the present disclosure will become more apparent through the more detailed description of the example embodiments of the present disclosure with reference to the accompanying drawings, wherein the same reference sign generally refers to the like element in the example embodiments of the present disclosure.

In all figures, the same or corresponding symbols denote the same or corresponding parts.

DETAILED DESCRIPTION OF EMBODIMENTS

Figure 1:
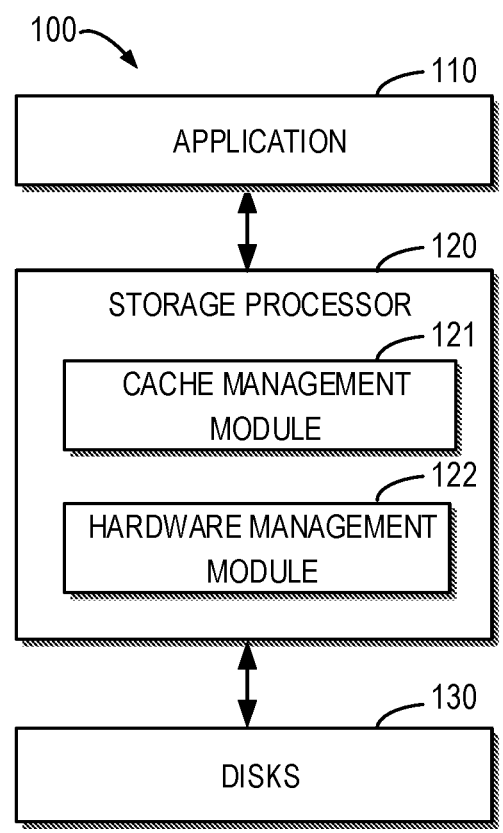
FIG. 1 illustrates a diagram of an architecture of an example storage system according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments of the present disclosure will be described in more details with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text can also include other explicit and implicit definitions.

As stated above, a storage system usually has a plurality of disks. The disks can be divided into a group of disk extents of a fixed size. For the purpose of data redundancy backup and/or performance improvement, it is possible to use a plurality of disk extents to build a redundant array of independent drives (RAID). The RAID built based on disk extents of the disk but not the whole disk is also called "mapped RAID". To ensure reliability of the mapped RAID, some spare disk extents are usually reserved in the plurality of disks. When a certain disk in the plurality of disks fails, these spare disk extents may be used to rebuild a RAID strip associated with the failure, thereby avoiding occurrence of data loss. However, when the mapped RAID does not fail, these spare disk extents are usually not used.

In addition, to improve access performance of the storage system, it is usual in the storage system to use a disk (e.g., a flash memory, or a solid-state disk) having a higher access speed to build a cache so as to be used to cache data which is accessed frequently. However, the capacity of such cache is usually limited.

As the system operates, the available capacity in the cache becomes less and less. When the available capacity in the cache is below a predetermined threshold, data cached in the cache might be flushed to the disk. Hence, when the capacity of the cache is small, such operation of writing the cached data back into the disk, and writing the data in the disk into the cache might occur repeatedly, thus will affect the lifetime of the cache and the disk.

An example embodiment of the present disclosure provides a solution for managing the cache. In this solution, the spare disk extents in the mapped RAID are used to create a secondary cache other than the cache mentioned above (hereinafter referred to as a "primary cache"). When the available capacity of the primary cache is below a predetermined threshold, it is possible to flush a cache page in the primary cache to the secondary cache according to the solution. In this manner, a total cache capacity in the system can be increased with this solution, thereby improving the access performance of the system. In addition, with this solution, both the times of write operations of flushing the cache page to the disk when the capacity of the primary cache is insufficient, and the times of write operations of rewriting the data flushed to the disk into the primary cache can be reduced, thereby extending the lifetime of the disk and the primary cache.

FIG. 1 illustrates a diagram of architecture of a storage system 100 according to embodiments of the present disclosure. As shown in FIG. 1, the storage system 100 may include an application 110, a storage processor (SP) 120 and one or more disks 130. It should be appreciated that the structure and function of the storage system 100 are described only for illustration purpose, not to imply any limitations of the scope of the present disclosure. Embodiments of the present disclosure may be reflected in different structures and/or functions.

The "disk" stated here may refer to any currently known or to-be-developed non-volatile storage medium, for example, a magnetic disk, an optical disk or a solid-state disk (SSD) etc. For example, each of the disks 130 may be divided into a set of continuous, non-overlapping and fixed sized disk extents. The plurality of extents of the plurality of disks 130 may be organized as the mapped RAID. In addition to building the mapped RAID, it should be appreciated that one or more disks in the disks 130 may also be used to build a conventional RAID (namely, the RAID built based on the whole disk but not extents of the disk), furthermore, the scope of the present disclosure is not limited with respective to this aspect.

Figure 2:
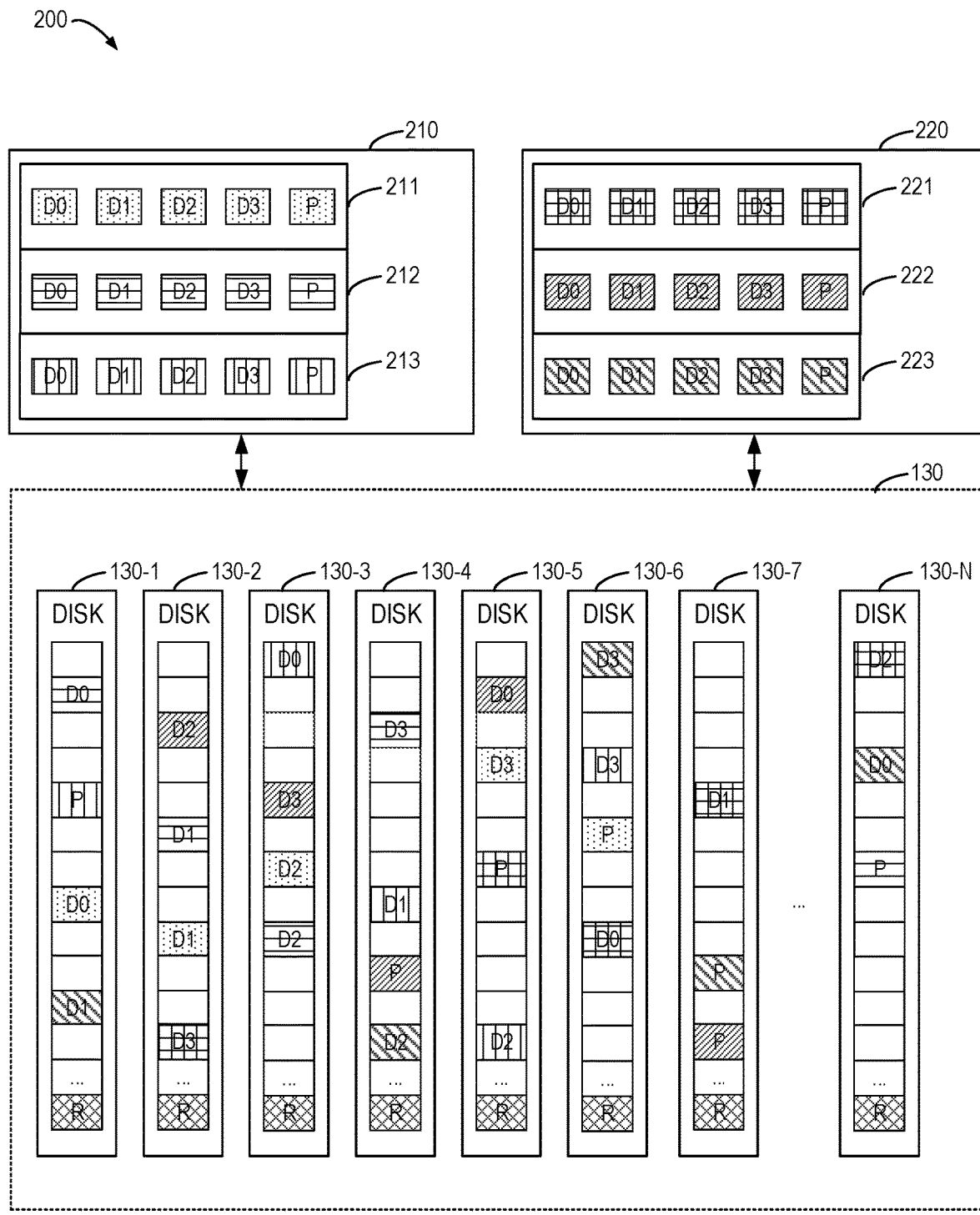
FIG. 2 illustrates a schematic diagram of an example disk array according to embodiments of the present disclosure.

FIG. 2 illustrates a schematic diagram of an example mapped disk array 200 according to the embodiments of the present disclosure, and shows an example of a mapped RAID built on the plurality of disks 130 as shown in FIG. 1. As shown in FIG. 2, for example, an example of RAID5 which has a 4D+1P layout and is built on N disks 130-1~130-N (collectively called "disks 130"), wherein N is larger than 5. In the example shown in FIG. 2, D0-D3 respectively represent data extents for storing user data, and P represents a parity extent for storing parity information. When a RAID strip (including D0-D3 and P) is created, it is possible to randomly select five extents from five different disks. As such, the user data and parity information are evenly distributed in all disks. For example, in the example in FIG. 2, an RAID group 210 and an RAID group 220 are created in the disks 130. The RAID group 210 may include RAID strips 211, 212 and 213, and the RAID group 220 may include RAID strips 221, 222 and 223. When the capacity of a storage resource pool 100 is extended by adding a new disk, the newly-added disk may also be divided into a plurality of extents, and these extents may be used to create a new RAID strip or another RAID group. In addition, to ensure the reliability of the mapped RAID, some spare extents, for example represented by R, are reserved on the disks 130. When a certain disk in the plurality of disks 130 fails, these spare disk extents can be used to rebuild a RAID strip associated with the failure, thereby avoiding occurrence of data loss.

A storage processor 120 may be configured to manage the disks 130. As shown in FIG. 1, for example, the storage processor 120 may include a cache management module 121 and a hardware management module 122. It should be appreciated that the structure and function of the storage processor 120 are described only for illustration purpose, but not to imply any limitation of the scope of the present disclosure. In some embodiments, the storage processor 120 may include additional modules; alternatively modules shown may be omitted.

The cache management module 121 may use a disk (e.g., a flash memory or a solid-state disk) having a higher access speed to create a cache (also called "primary cache") to cache frequently-accessed data therein. In virtual page storage, data exchange between the cache and disks is performed on a basis of pages. For example, the cache management module 121 may allocate, for data to be cached, one or more cache pages for caching the data. In order to ensure data consistency, data being cached in the primary cache may be flushed into the disks 130 at a proper time. In the following depictions, data or cache page cached in the cache and not yet submitted to the disks 130 is also called "dirty data" or "dirty page". On the contrary, data or cache page cached in the cache and already submitted to the disks 130 is also called "clean data" or "clean page".

To increase the capacity of the cache and improve the access performance of the storage system, the cache management module 121 may further use spare extents (namely, extents marked with "R") in the disks 130 shown in FIG. 2 to create the secondary cache. For example, when the available capacity of the primary cache is below a predetermined threshold, the cache management module 121 may flush at least one cache page in the primary cache to the secondary cache. When the number of the disks 130 increases or the capacity thereof is extended, the number of the spare extents may also be increased accordingly. The cache management module 121 may use these added spare extents to extend the capacity of the secondary cache. When a certain disk in the disks 130 fails, the cache management module 121 may remove at least one portion in the spare extents serving as the secondary cache from the secondary cache, so that the removed spare extents are used to rebuild the RAID strip associated with the failure, thereby avoiding occurrence of data loss.

The hardware management module 122 may perform corresponding operations in response to a request of the cache management module 121. For example, the hardware management module 122 may organize the spare extents of the disks 130 in one or more virtual disks, and return information about the virtual disks to the cache management module 121, so that the cache management module 121 can create or extend the secondary cache based on the information. When the mapped RAID formed by the disks 130 fails, the hardware management module 122 may send a request to the cache management module 121 to release spare extents occupied by the secondary cache, to rebuild the RAID strip associated with the failure.

To enable the hardware management module 122 to release spare extents at any time if necessary to rebuild the failed mapped RAID, the secondary cache may be a read-only cache, whereas the primary cache may be a readable/writeable cache. That is, the cache management module 121 can only flush the clean page to the secondary cache so that the data cached in the secondary cache needn't be flushed to the disks 130. As such, when the hardware management module 122 needs, the spare extents occupied by the secondary cache can be released very quickly to rebuild the failed mapped RAID.

The application 110 may run on any physical computer, virtual machine or server etc. The application 110 may send a read request or write request to the storage processor 120. For example, the read request may be first sent to the cache management module 121 to determine whether the requested data is already cached in the primary cache or secondary cache. When the requested data is already cached (also called "cache hit"), it is possible to obtain the requested data from the primary cache or secondary cache, as a response to the read request. When the requested data is not cached (also called "cache miss"), the read request may be sent via the cache management module 121 to the disks 130, to obtain the requested data from the disks 130. Similarly, the write request may first be sent to the cache management module 121 to determine whether data to be written to an address is already cached in the primary cache or secondary cache. When the data to be written to the address is already cached in the primary cache, the data to be written may be written into a corresponding cache page of the primary cache, and be flushed to the disks 130 at a proper moment later. When the data to be written to the address is already cached by in the secondary cache other than the primary cache, it is possible to invalidate the corresponding cache page in the secondary cache (this is because the secondary cache only caches clean data not dirty data). In addition, it is possible to allocate a corresponding cache page in the primary cache, to write the to-be-written data therein. When the data to be written into the address is not cached to the primary cache or secondary cache (namely, cache miss), the to-be-written data may be written into the disks 130.

Reference will be further made to describe the operation of cache management module 121 and hardware management module 122 in detail.

Figure 3:
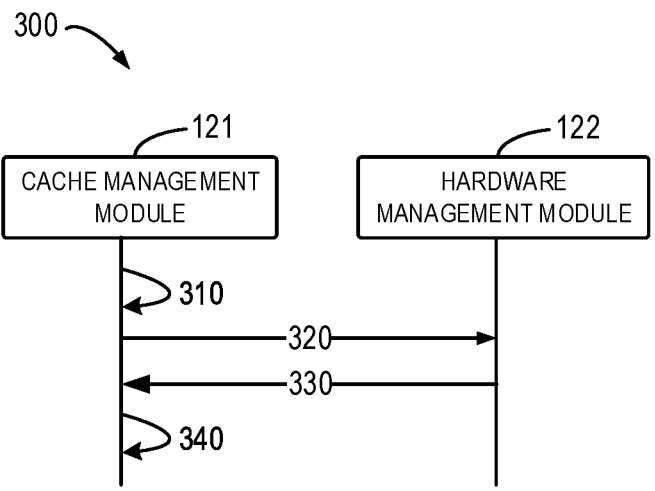
FIG. 3 illustrates a flow chart of an example process of creating a secondary cache according to embodiments of the present disclosure.

FIG. 3 illustrates a flow chart of an example process 300 of creating a secondary cache according to the embodiments of the present disclosure. For illustration purpose, the process 300 is described with reference to the cache management module 121 and hardware management module 122 as shown in FIG. 1. It should be appreciated that the process 300 may further include additional acts not shown and/or acts shown may be omitted. The scope of the present disclosure is not limited in this aspect.

As shown in FIG. 3, the cache management module 121 may create 310 the primary cache. In some embodiments, the primary cache may be a readable/writeable cache. For example, the primary cache may be comprised of a disk (e.g., a flash memory or a solid-state disk etc.) having a higher access speed. Take the solid-state disk as an example. For example, the primary cache may be comprised of a disk with high endurance (e.g., supporting 25 write/day) and/or medium endurance (e.g., supporting 10 write/day).

In some embodiments, to improve the availability, the primary cache for example may include one or more pairs of disks, and each pair of disks may be organized as an RAID (namely, mirrored to each other). This can ensure that data loss does not occur when a disk of one pair of disks fails or get disconnected. In the text, such pair of disk may also be called "cache device". In some embodiments, each cache device may be divided into four logical storage units, including two metadata units and two user data units. The metadata units for example may be used to store data structure (e.g., a hash table including hash table entries corresponding to the cache page in the primary cache) indicating index information (e.g., information about which data are cached). The user data unit for example may be used to cache the user data.

Figure 4:
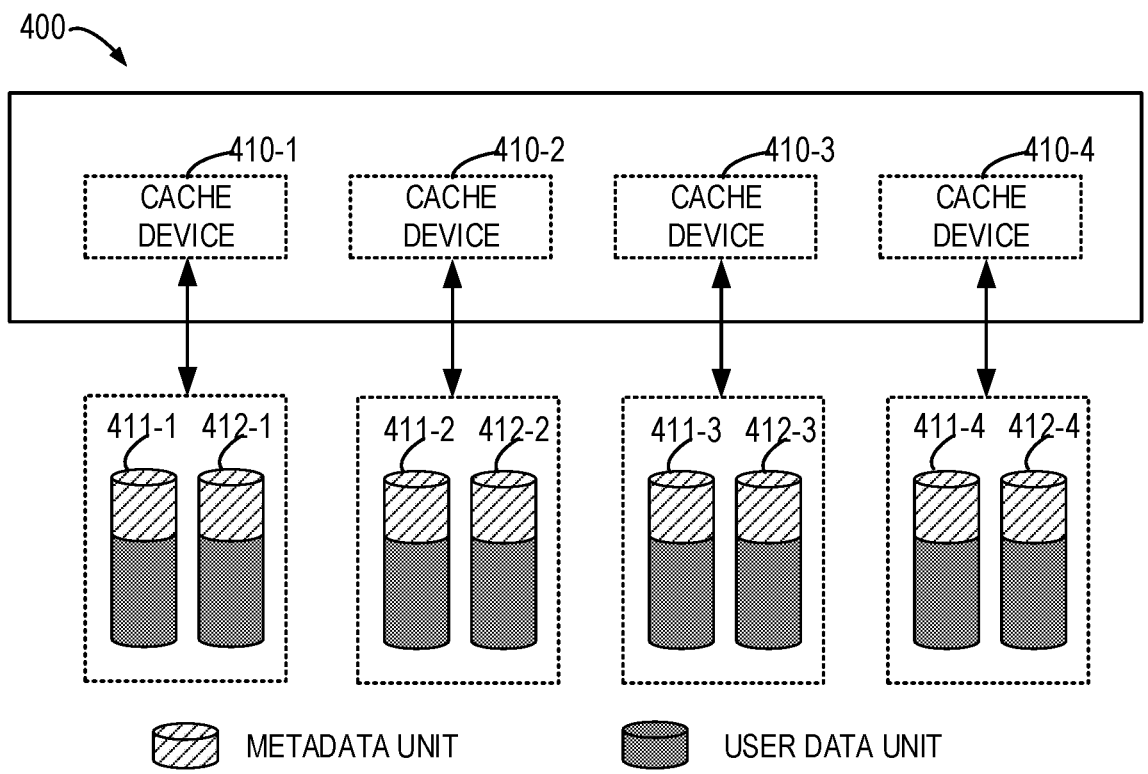
FIG. 4 illustrates a schematic diagram of an example primary cache according to embodiments of the present disclosure.

FIG. 4 illustrates a schematic diagram of an example primary cache 400 according to the embodiments of the present disclosure. As shown in FIG. 4, the primary cache 400 for example may include four cache devices 410-1 to 410-4 (collectively called cache device 410). The cache device 410 for example may include one pair of disks 411-1 and 412-1 which form a RAID1. Similarly, the cache device 410-2 for example may include one pair of disks 411-2 and 412-2 which form the RAID1, cache device 410-3 for example may comprise one pair of disks 411-3 and 412-3 which form the RAID1, and the cache device 410-4 for example may include one pair of disks 411-4 and 412-4 which form the RAID1. In addition, as shown in FIG. 4, each cache device 410 is divided into four logical storage units, including two metadata units and two user data units. It should be appreciated that the primary cache 400 shown in FIG. 4 is shown only for illustration purpose. The embodiments of the present disclosure are also adapted for a primary cache built in other manners, and the scope of the present disclosure is not limited in this aspect.

Returning to FIG. 3, in response to the primary cache being created, the cache management module 121 may send 320 a request to the hardware management module 122, to obtain information about one or more virtual disks.

The "virtual disk" stated here may be created by the hardware management module 122 based on the spare extents in the mapped RAID (e.g., the mapped disk array 200 shown in FIG. 2). In some embodiments, all spare extents from one mapped RAID may be built as one virtual disk. In the text, "virtual disk" may also be called "virtual cache device".

Figure 5:
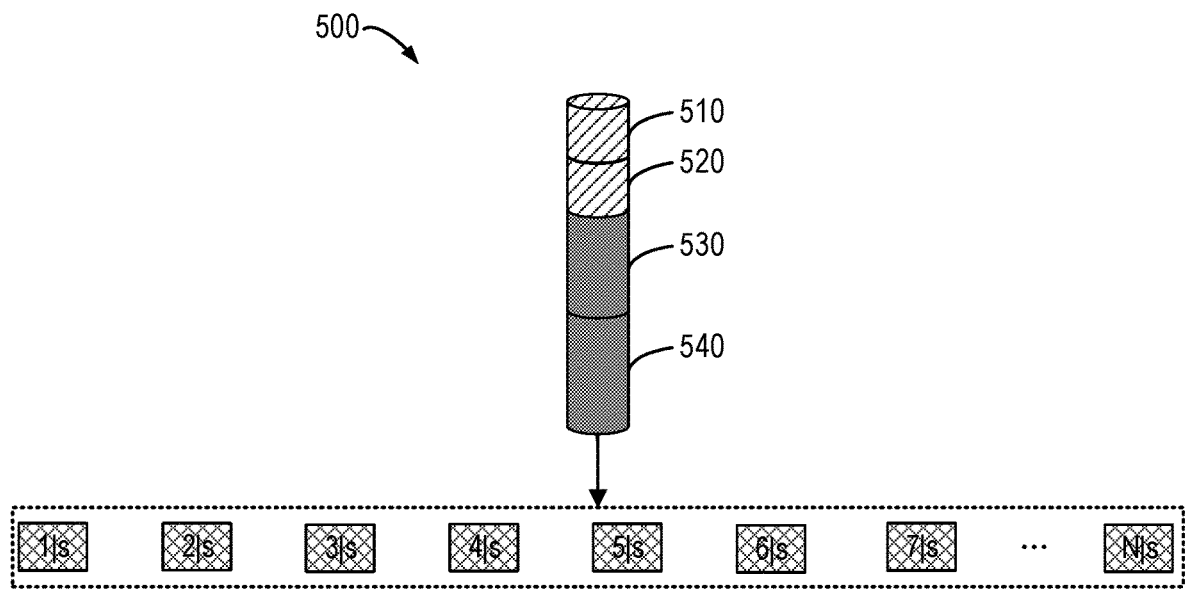
FIG. 5 illustrates a schematic diagram of an example virtual disk according to embodiments of the present disclosure.

FIG. 5 illustrates a schematic diagram of an example virtual disk 500 according to the embodiments of the present disclosure. For example, the virtual disk 500 may be comprised of all spare extents marked with "R" in the example disk array 200 as shown in FIG. 2.

Here, it is assumed that a symbol "x|s" is used to represent spare extents in the disks 130-$x$ (wherein x∈[1,N]). As shown in FIG. 5, in some embodiments, the hardware management module 122 may organize spare extents "1|s", "2|s" "N|s" into the virtual disk 500. In addition, as shown in FIG. 5, the hardware management module 122 may further divide the virtual disk 500 into four logical storage units, including two metadata units 510 and 520, and two user data units 530 and 540. The metadata units for example may be used for a hash table indicating index information (e.g., information about which data are cached), including hash table entries corresponding to the cache page in the virtual disk. The user data units for example may be used to cache user data.

In some embodiments, the cache management module 121 may send a first request to the hardware management module, to obtain a list of all virtual disks existed in the storage system. For example, if there are virtual disks (e.g., there are spare extents for building virtual disks) existed in the storage system, the hardware management module 122 may return 330 such list to the cache management module 121. If there is no virtual disk in the system, the hardware management module 122 may return 330 an empty list to the cache management module 121. For example, information returned by the hardware management module 122 may include an identifier (e.g., the identifier may be an identifier of the corresponding mapped RAID) and capacity (e.g., the total capacity of spare extents occupied by the virtual disk) of each virtual disk existed in the system.

Figure 6:
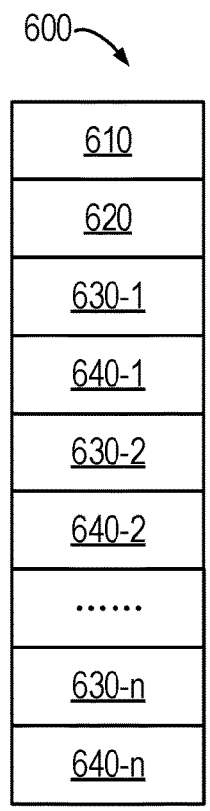
FIG. 6 illustrates a schematic diagram of example information about the virtual disk according to embodiments of the present disclosure.

FIG. 6 illustrates a schematic diagram of example information 600 returned by the hardware management module 122 according to the embodiments of the present disclosure. As shown in FIG. 6, for example the information 600 may include the following fields: message response type 610, the number of virtual disks 620 (e.g., the number is n, wherein n>1), the identifier 630-1 and capacity 640-1 of virtual disk #1, the identifier 630-2 and capacity 640-2 of virtual disk #2 . . . the identifier 630-$n$ and capacity 640-$n$ of virtual disk #n.

Returning to FIG. 3, when the cache management module 121 receives such information from the hardware management module 122, the cache management module 121 may create 340 a secondary cache based on the information. Here it is assumed that the information returned by the hardware management module 122 includes first information about the first virtual disk in the storage system. In some embodiments, the cache management module 121 may, based on the first information, use the first virtual disk to create the secondary cache.

Figure 7:
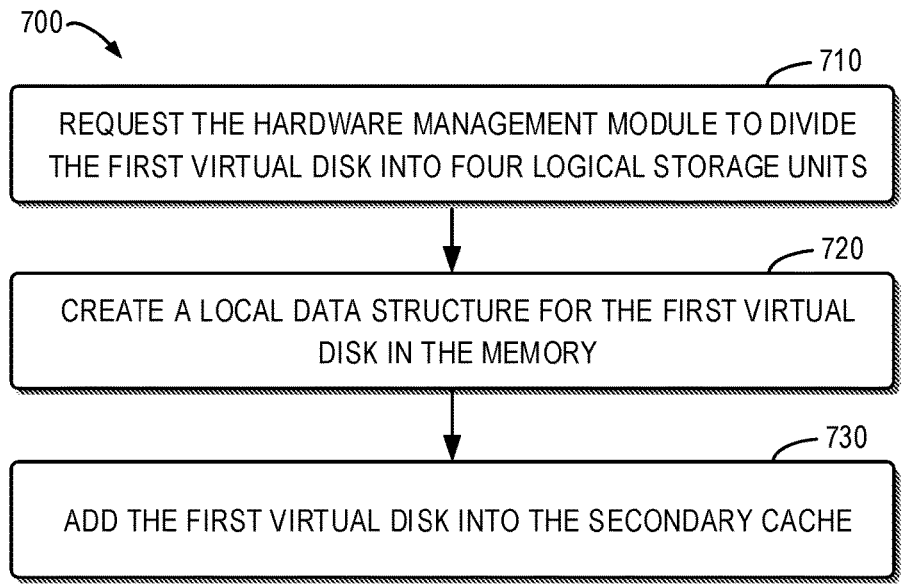
FIG. 7 illustrates a flow chart of an example method of using a first virtual disk to create the secondary cache according to embodiments of the present disclosure.

FIG. 7 illustrates a flow chart of a method 700 of using the first virtual disk to create the secondary cache according to the embodiments of the present disclosure. The method 700 for example may be performed by the cache management module 121, and may be regarded as an example implementation of the act 340 shown in FIG. 3.

As shown in FIG. 7, at 710, the cache management unit 121 requests the hardware management module 122 to divide the first virtual disk into four logical storage units, including two metadata units for storing index information (e.g., information about which data is cached) and two user data units for caching user data, for example. In some embodiments, the size of the created metadata unit and the size of the created user data unit may be in a predetermined proportion (e.g., 1:128). For example, the size of the created metadata unit and the size of the created user data unit are respectively as shown in Equations (1) and (2):

$$\text{metadata unit size} = \frac{1}{(1+128)} \times \frac{\text{total capacity of virtual disk}}{2} \quad \text{Equation (1)}$$

$$\text{user data unit size} = \frac{128}{(1+128)} \times \frac{\text{total capacity of virtual disk}}{2} \quad \text{Equation (2)}$$

At 720, the cache management unit 121 may create a local data structure for the first virtual disk in the memory. Then, at 730, the cache management module 121 may add the first virtual disk into the secondary cache (e.g., including recording information about the first virtual disk in a corresponding database).

In some embodiments, when the received virtual disk table includes a plurality of virtual disks, the cache management module 121 may repeatedly execute the above method 700 to add a plurality of virtual disks into the secondary cache. In this manner, the secondary cache can be created based on the spare extents of the mapped RAID.

Figure 8:
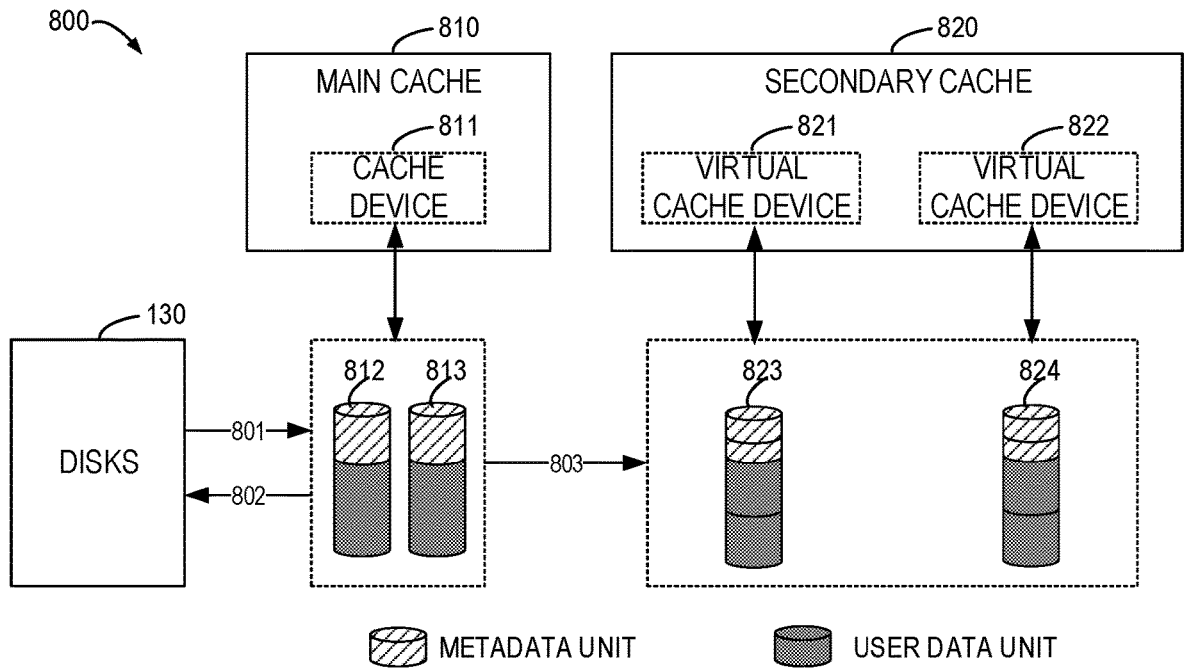
FIG. 8 illustrates a schematic diagram of an example cache system including the primary cache and the secondary cache according to embodiments of the present disclosure.

FIG. 8 illustrates a schematic diagram of a cache system 800 including the primary cache and the secondary cache according to the embodiments of the present disclosure. As shown in FIG. 8, the cache system 800 may include a primary cache 810 and a secondary cache 820. The primary cache 810 for example may include a cache device 811 including a pair of disks 812 and 813 which form RAID1. The secondary cache 820 for example may include a virtual cache device 821 and a virtual cache device 822. The virtual cache device 821 corresponds to the virtual disk 823. The virtual disk 823 is comprised of spare extents in a mapped RAID (not shown). The virtual cache device 822 corresponds to the virtual disk 824, and the virtual disk 824 is comprised of spare extents in another mapped RAID (not shown).

In some embodiments, when the primary cache and secondary cache are created, the user data may be cached in one of the two according to predetermined rules. As shown in FIG. 8, frequently-accessed user data may be first cached 801 to a readable/writeable primary cache 810. The dirty page or dirty data in the primary cache 810 may be flushed 802 to the disks 130 at a suitable time.

As the storage system operates, free cache pages in the primary cache might become less and less. When the available capacity of the primary cache is below a predetermined threshold, it is possible to select, from the primary cache, a cache page which is not accessed often, to flush 803 to the secondary cache 820. In some embodiments, it is possible to determine the cache page to be flushed to the secondary cache 820 in a round robin manner.

In this manner, the primary cache will have more pages for caching data which is read/written frequently. Meanwhile, since the page being flushed to the secondary cache is a page which is not accessed often, even though the virtual disk including the page in the secondary cache is removed, this does not cause great influence on the accessibility of the system.

Figure 9A:
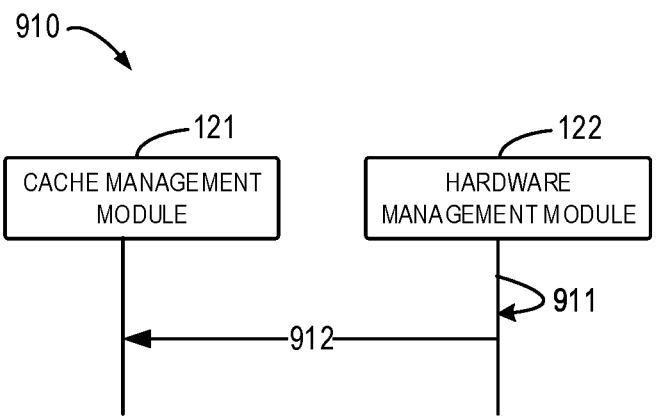
FIG. 9A illustrates a flow chart of an example process of extending the secondary cache according to embodiments of the present disclosure.

In some embodiments, the secondary cache may be extended. FIG. 9A illustrates a flow chart of an example process 910 of extending the secondary cache according to the embodiments of the present disclosure. For illustration purpose, the process 910 is described in FIG. 9A in relation to the cache management module 121 and hardware management module 122 as shown in FIG. 1. It should be appreciated that the process 910 may further include additional acts not shown and/or acts shown may be omitted. The scope of the present disclosure is not limited in this aspect.

When a new mapped RAID is created or the capacity of the mapped RAID is extended, there might exist new spare extents which are reserved for the rebuilding function. In this case, as shown in FIG. 9A, in response to presence of available new spare extents in the storage system, the hardware management module 122 may create 911 a new virtual disk (hereinafter referred to as a second virtual disk or a third virtual disk) based on these new spare extents. For example, the hardware management module 122 may allocate an identifier to the new virtual disk and calculate its capacity, then return information about the new virtual disk (hereinafter referred to as second information or third information) to the cache management module 121 through the example information 600 shown in FIG. 6. In addition, the hardware management module 122 may further divide the new virtual disk into corresponding logical storage units.

When the cache management module 121 receives information about the new virtual disk, the cache management module 121 may use the new virtual disk to extend 912 the secondary cache. For example, the cache management module 121 may create a local data structure in a memory of the new virtual disk, and add the new virtual disk into the secondary cache.

Figure 9B:
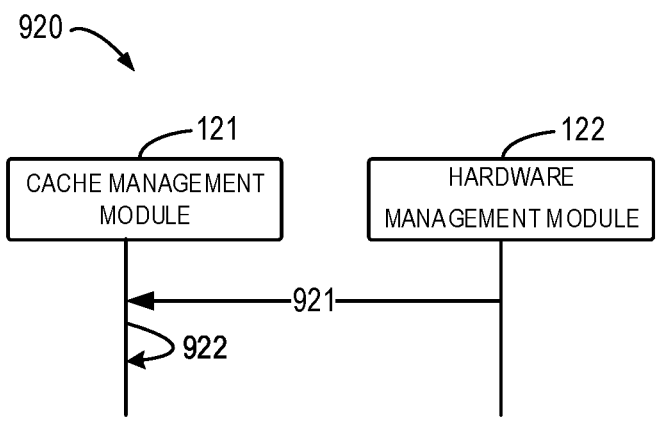
FIG. 9B illustrates a flow chart of an example process of shrinking the secondary cache according to embodiments of the present disclosure.

In some embodiments, the secondary cache may be shrunk. FIG. 9B illustrates a flow chart of an example process 920 of shrinking the secondary cache according to the embodiments of the present disclosure. For illustration purpose, the process 920 is described in FIG. 9B in relation to the cache management module 121 and hardware management module 122 as shown in FIG. 1. It should be appreciated that the process 920 may further include additional acts not shown and/or acts shown may be omitted. The scope of the present disclosure is not limited in this aspect.

As shown in FIG. 9B, for example when the hardware management module 122 needs spare extents to rebuild the mapped RAID when a failure occurs, the hardware management module 122 may send 921 a second request to the cache management module 121, so as to remove the virtual disk (e.g., the first virtual disk) from the secondary cache. Alternatively, the hardware management module 122 may further mark the logical storage units built on the first virtual disk as unavailable.

In response to receiving the second request or in response to detecting the logical storage units marked as unavailable, the cache management module 121 may remove 922 the first virtual disk from the secondary cache. For example, the cache management module 121 may release the memory allocated for the first virtual disk, and then the cache management module 121 may destroy the logical storage units (namely, metadata units and user data units) created on the first virtual disk. When the hardware management module 122 finds that all logical storage units built on the first virtual disk are destroyed, it may use the spare extents being released to rebuild the mapped RAID when a failure occurs. Since there is no dirty page in the secondary cache, it is possible to release the virtual disk from the secondary cache very quickly.

In this manner, the cache management module 121 can create, extend and/or shrink the secondary cache. When the cache management module 121 receives a read/write request from an upper-layer application 110, the cache management module 121 may use the primary cache and/or secondary cache to process the I/O request.

Take a read request as an example. In response to receiving the read request from the upper-layer application 110, the cache management module 321 may determine whether the requested data is already stored in the primary cache or secondary cache. For example, the cache management module 321 may determine whether the requested data is already cached in the primary cache by looking up a hash table in the metadata unit of the primary cache. Similarly, the cache management module 321 may determine whether the requested data is already cached in the virtual disk of the secondary cache by looking up a hash table in the metadata unit of each virtual disk in the secondary cache. When the cache management module 321 determines that the requested data is already cached, it is possible to obtain the requested data from the primary cache or secondary cache, as a response to the read request. When the requested data is not yet cached, the read request may be sent to the disks 130 via the cache management module 121, so as to obtain the requested data from the disks 130.

Figure 10:
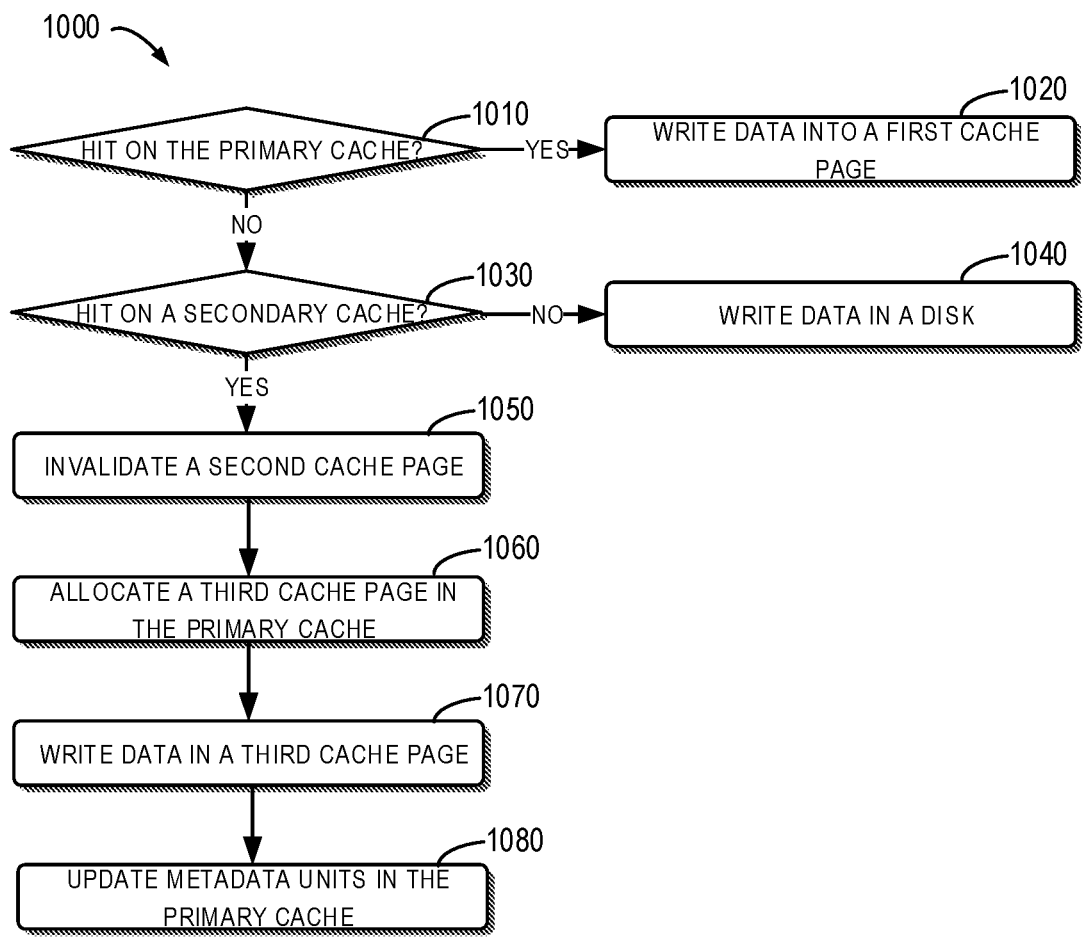
FIG. 10 illustrates a flow chart of an example method of processing a write request according to embodiments of the present disclosure.

Regarding a write request, FIG. 10 illustrates a flow chart of a method 1000 of processing a write request according to the embodiments of the present disclosure. The method 1000 for example may be executed by the cache management module 121. It should be appreciated that the method 1000 may further include additional acts not shown and/or acts shown may be omitted. The scope of the present disclosure is not limited in this aspect.

At 1010, in response to receiving from the upper-layer application 110 a write request (hereinafter referred to as "a third request") to write first data to the storage system, the cache management module 121 determines whether the primary cache includes a first cache page for caching data in an address to which the first data is to be written (namely, whether the primary cache is hit). If yes, at 1020, the cache management module 121 writes the first data into the first cache page. If not, the method 1000 proceeds to 1030, where the cache management module 121 determines whether a second cache page for caching data in the address to which the first data is to be written is present in the secondary cache (namely, whether the secondary cache is hit). If not, at 1040, the cache management module 121 writes the first data into the disks 130.

If it is determined that the second cache page is present in the secondary cache, at 1050, the cache management module 121 may invalidate the second cache page. For example, the cache management module 121 may invalidate entries in the metadata units in the corresponding virtual disk corresponding to the second cache page. However, at 1060, the cache management module 121 may allocate a new cache interface (hereinafter referred to as "a third cache page") in the primary cache. At 1070, the cache management module 121 may write the first data into the allocated third cache page. At 1080, the cache management module 121 may add entries corresponding to the third cache page to the metadata unit of the primary cache.

In this manner, the cache management unit 121 can use the primary cache and secondary cache to process an input/output request for the storage system. The secondary cache can increase the total capacity of the cache in the system, thereby improving the access performance of the system. In addition, the use of the secondary cache can reduce the times of write operations of flushing the cache page to the disk when the capacity of the primary cache is insufficient, and the times of write operations of rewriting the data flushed to the disk into the primary cache, thereby extending the lifetime of the disk and the primary cache.

In some embodiments, for example when the storage system activates, the virtual disk in the secondary cache might fail. For example, the hardware management module 122 may notice such failure, and notifies the cache management module 121 of the failure. In some embodiments, when the cache management module 121 receives an indication that a certain virtual disk (e.g., the first virtual disk) in the secondary cache fails, it may remove the virtual disk from the secondary cache. The operation of removing the virtual disk is similar to the operation of shrinking the secondary cache described above. For example, the cache management module 121 may release a memory (e.g., including a hash table and a metadata memory and so on) allocated for the virtual disk, and then the cache management module 121 may destroy the logical storage units (namely, metadata units and user data units) created on the virtual disk. In addition, the cache management module 121 may further remove other records (e.g., records in the database etc.) associated with the virtual disk.

Figure 11:
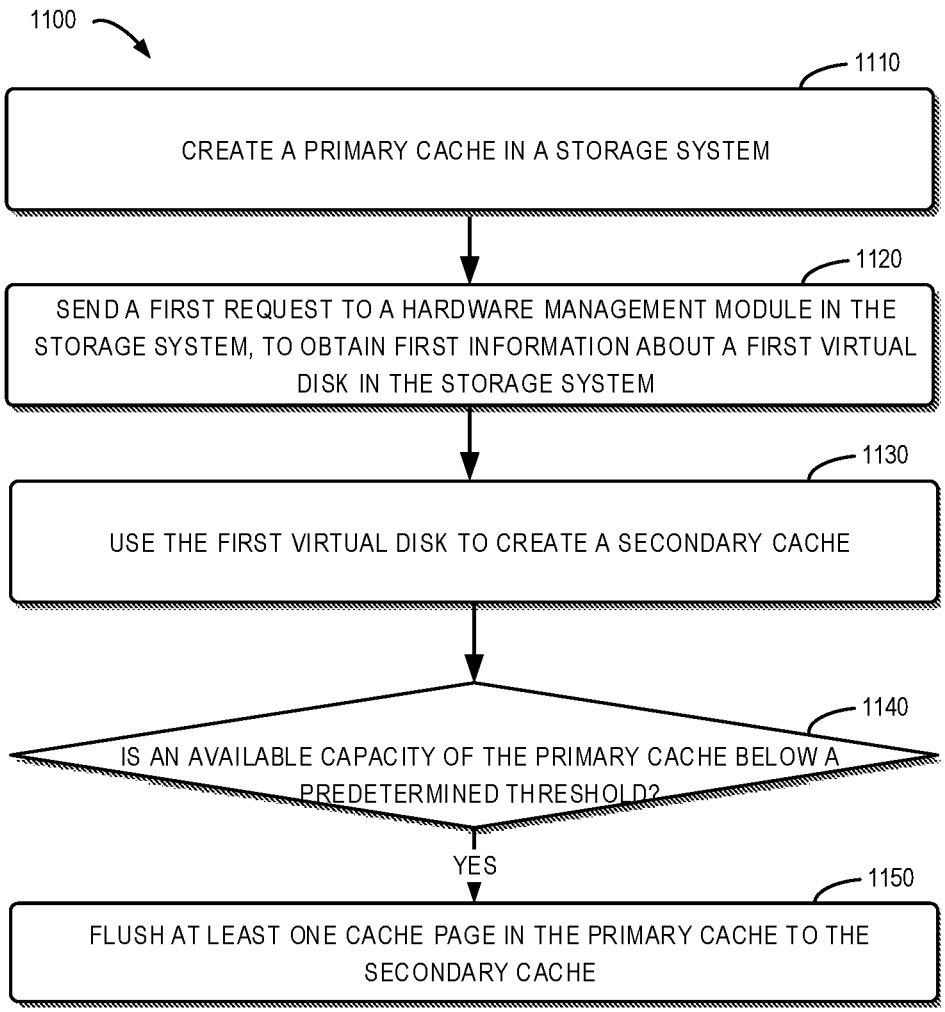
FIG. 11 illustrates a flow chart of an example method of managing the cache according to embodiments of the present disclosure.

FIG. 11 illustrates a flow chart of an example method 1100 of managing the cache according to the embodiments of the present disclosure. For example, the method 1100 for example may be executed by the cache management module 121 shown in FIG. 1. It should be appreciated that the process 1100 may further include additional acts not shown and/or acts shown may be omitted. The scope of the present disclosure is not limited in this aspect.

At 1110, the cache management module 121 creates a primary cache in the storage system.

At 1120, in response to the primary cache being created, the cache management module 121 sends a first request to the hardware management module in the storage system to obtain first information about a first virtual disk in the storage system.

In some embodiments, the storage system includes at least one physical disk having a plurality of extents. The plurality of extents include a first group of extents for creating a first disk array, and the first virtual disk is created by the hardware management module based on at least one spare extent in the first group of extents, the at least one spare extent in the first group of extents is reserved for rebuilding the first disk array.

In some embodiments, the primary cache is a read-write cache, and the secondary cache is a read-only cache.

At 1130, in response to receiving the first information from the hardware management module 122, the cache management module 121 uses the first virtual disk to create the secondary cache.

In some embodiments, the first information includes at least one of an identifier and a capacity of the first virtual disk.

At 1140, the cache management module 121 determines whether an available capacity of the primary cache is below a predetermined threshold. When the cache management module 121 determines that the available capacity of the primary cache is below the predetermined threshold, at 1150, the cache management module 121 flushes at least one cache page in the primary cache to the secondary cache.

In some embodiments, flushing the at least one cache page in the primary cache to the secondary cache includes: in response to the available capacity of the primary cache being below a predetermined threshold, determining, from the primary cache, at least one cache page that does not need to be flushed to the at least one physical disk; and flushing the at least one cache page to the secondary cache.

In some embodiments, the method 1100 further includes: in response to the secondary cache being created and second information about a second virtual disk in the storage system being received from the hardware management module, extending the secondary cache using the second virtual disk. In some embodiments, the plurality of extents further include a second group of extents for creating a second disk array, and the second virtual disk is created by the hardware management module based on at least one spare extent from the second group of extents, the at least one spare extent from the second group of extents is reserved for rebuilding the second disk array. Alternatively, in some other embodiments, the plurality of extents further include a third group of extents for extending the first disk array, and the third virtual disk is created by the hardware management module based on at least one spare extent from the third group of extents, the at least one spare extent from the third group of extents is reserved for rebuilding the extended first disk array.

In some embodiments, the method 1100 further includes: in response to receiving, from the hardware management module, a second request to remove the first virtual disk from the secondary cache to rebuild the first disk array with the at least one spare extent, removing the first virtual disk from the secondary cache.

In some embodiments, the method 1100 further includes: in response to receiving, from an application, a third request to write first data to the storage system, determining whether a first cache page for caching data in an address to which the first data is to be written is present in the primary cache; and in response to determining that the first cache page is present in the primary cache, writing the first data to the first cache page.

In some embodiments, the method 1100 further includes: in response to determining that the first cache page is absent from the primary cache, determining whether a second cache page for caching data in an address to which the first data is to be written is present in the secondary cache; and in response to determining that the second cache page is absent from the secondary cache, writing the first data into at least one physical disk.

In some embodiments, the method 1100 further includes: in response to determining that the second cache page is present in the secondary cache, invalidating the second cache page; allocating, in the primary cache, a third cache page for caching data in the address to which the first data is to be written; and writing the first data into the third cache page.

In some embodiments, the method 1100 further includes: in response to receiving, from the hardware management module, an indication that the first virtual disk fails, removing the first virtual disk from the secondary cache.

As can be seen from the above depictions, the solution for managing the cache according to the embodiments of the present disclosure uses the spare disk extents in the mapped RAID to create the secondary cache other than the primary cache. When the available capacity of the primary cache is below a predetermined threshold, it is possible to flush the cache page in the primary cache to the secondary cache according to the solution. In this manner, this solution can increase a total capacity of the cache in the system, thereby improving access performance of the system. In addition, the solution can reduce times of write operations of flushing the cache page to the disk when the capacity of the primary cache is insufficient and times of write operations of rewriting the data flushed to the disk into the primary cache, thereby extending the lifetime of the disk and the primary cache.

Figure 12:
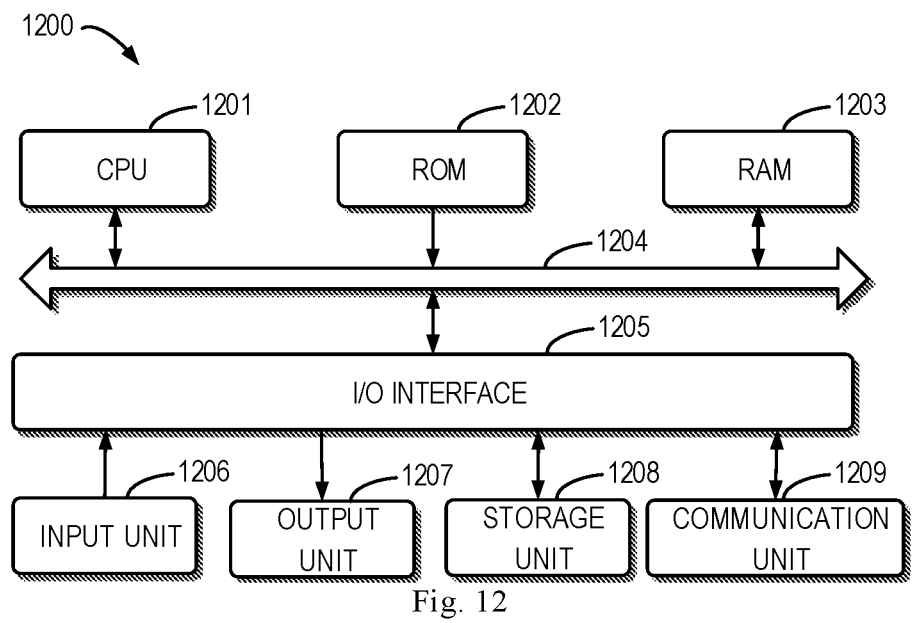
FIG. 12 illustrates a block diagram of an example device adapted to implement an embodiment of the present disclosure.

FIG. 12 illustrates a block diagram of an example device 1200 adapted to implement an embodiment of the present disclosure. For example, the storage processor 120 (e.g., the cache management module 121 and/or hardware management module 122) as shown in FIG. 1 may be implemented by the device 1200. As shown in FIG. 12, the device 1200 includes a central processing unit (CPU) 1201 that may perform various appropriate actions and processing based on computer program instructions stored in a read-only memory (ROM) 1202 or computer program instructions loaded from a memory unit 1208 to a random access memory (RAM) 1203. In the RAM 1203, there further store various programs and data needed for operations of the device 1200. The CPU 1201, ROM 1202 and RAM 1203 are connected to each other via a bus 1204. An input/output (I/O) interface 1205 is also connected to the bus 1204.

Various components in the device 1200 are connected to the I/O interface 1205, including: an input unit 1206 such as a keyboard, a mouse and the like; an output unit 12012 including various kinds of displays and a loudspeaker, etc.; a memory unit 1208 including a magnetic disk, an optical disk etc.; and a communication unit 1209 including a network card, a modem, and a wireless communication transceiver, etc. The communication unit 1209 allows the device 1200 to exchange information/data with other devices through a computer network such as Internet and/or various kinds of telecommunications networks.

Various processes and processing described above, e.g., process 300, 800, 910 and/or 920, and/or method 700, 1000 and/or 1100, may be executed by the processing unit 1201. For example, in some embodiments, process 300, 800, 910 and/or 920, and/or method 700, 1000 and/or 1100 may be implemented as a computer software program that is tangibly embodied on a machine readable medium, e.g., the storage unit 1208. In some embodiments, the computer program may be partially or fully loaded and/or mounted to the device 1200 via the ROM 1202 and/or the communication unit 1209. When the computer program is loaded to the RAM 1203 and executed by the CPU 1201, one or more acts of the process 300, 800, 910 and/or 920, and/or the method 700, 1000 and/or 1100 as described above may be executed.

The present disclosure may be a method, an apparatus, a system and/or a computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a cache, comprising:
   creating a primary cache by a cache management module in a storage system;
   in response to the primary cache being created, sending a first request to a hardware management module in the storage system to obtain first information about a first virtual disk in the storage system,
      wherein the storage system comprises at least one physical disk having a plurality of extents, the plurality of extents comprise a first group of extents for creating a first disk array, and the first virtual disk is created by the hardware management module based on at least one spare extent from the first group of extents, the at least one spare extent from the first group of extents being reserved for rebuilding the first disk array;

in response to receiving the first information from the hardware management module, creating a secondary cache using the first virtual disk; and in response to an available capacity of the primary cache being below a predetermined threshold, flushing at least one cache page in the primary cache to the secondary cache.

2. The method according to claim 1, wherein the primary cache is a read-write cache, and the secondary cache is a read-only cache.

3. The method according to claim 1, further comprising:
in response to receiving, from the hardware management module, a second request to remove the first virtual disk from the secondary cache to rebuild the first disk array with the at least one spare extent, removing the first virtual disk from the secondary cache.

4. The method according to claim 1, wherein the first information includes at least one of an identifier and a capacity of the first virtual disk.

5. The method according to claim 2, further comprising:
in response to receiving, from an application, a third request to write first data to the storage system, determining whether a first cache page for caching data in an address to which the first data is to be written is present in the primary cache; and in response to determining that the first cache page is present in the primary cache, writing the first data to the first cache page.

6. The method according to claim 5, further comprising:
in response to determining that the first cache page is absent from the primary cache, determining whether a second cache page for caching data in an address to which the first data is to be written is present in the secondary cache; and in response to determining that the second cache page is absent from the secondary cache, writing the first data into the at least one physical disk.

7. The method according to claim 6, further comprising:
in response to determining that the second cache page is present in the secondary cache, invalidating the second cache page;

allocating, in the primary cache, a third cache page for caching data in the address to which the first data is to be written; and writing the first data into the third cache page.

8. The method according to claim 2, wherein flushing the at least one cache page in the primary cache to the secondary cache comprises:
in response to the available capacity of the primary cache being below the predetermined threshold, determining, from the primary cache, the at least one cache page that does not need to be flushed to the at least one physical disk; and flushing the at least one cache page to the secondary cache.

9. The method according to claim 1, further comprising:
in response to the secondary cache being created and second information about a second virtual disk in the storage system being received from the hardware management module, extending the secondary cache using the second virtual disk, wherein the plurality of extents further comprise a second group of extents for creating a second disk array, and the second virtual disk is created by the hardware management module based on at least one spare extent from the second group of extents, the at least one spare extent from the second group of extents being reserved for rebuilding the second disk array.

10. The method according to claim 1, further comprising:
in response to the secondary cache being created and third information about a third virtual disk in the storage system being received from the hardware management module, extending the secondary cache using the third virtual disk, wherein the plurality of extents further comprise a third group of extents for extending the first disk array, and the third virtual disk is created by the hardware management module based on at least one spare extent from the third group of extents, the at least one spare extent from the third group of extents being reserved for rebuilding the extended first disk array.

11. The method according to claim 1, further comprising:
in response to receiving, from the hardware management module, an indication that the first virtual disk fails, removing the first virtual disk from the secondary cache.

12. An apparatus for managing a cache, comprising:
at least one processing unit;
at least one memory, the at least one memory being coupled to the at least one processing unit and has instructions stored thereon and executed by the at least one processing unit, the instructions, when executed by the at least one processing unit, causing the device to perform acts, the acts comprising:
creating a primary cache in a storage system;
in response to the primary cache being created, sending a first request to a hardware management module in the storage system to obtain first information about a first virtual disk in the storage system,
wherein the storage system comprises at least one physical disk having a plurality of extents, the plurality of extents comprise a first group of extents for creating a first disk array, and the first virtual disk is created by the hardware management module based on at least one spare extent from the first group of extents, the at least one spare extent from the first group of extents being reserved for rebuilding the first disk array;
in response to receiving the first information from the hardware management module, creating a secondary cache using the first virtual disk; and
in response to an available capacity of the primary cache being below a predetermined threshold, flushing at least one cache page in the primary cache to the secondary cache.

13. The apparatus according to claim 12, wherein the primary cache is a read-write cache, and the secondary cache is a read-only cache.

14. The apparatus according to claim 12, wherein the acts further comprise:
in response to receiving, from the hardware management module, a second request to remove the first virtual disk from the secondary cache to rebuild the first disk array with the at least one spare extent, removing the first virtual disk from the secondary cache.

15. The apparatus according to claim 12, wherein the first information includes at least one of an identifier and a capacity of the first virtual disk.

16. The apparatus according to claim 13, wherein the acts further comprise:
in response to receiving, from an application, a third request to write first data to the storage system, determining whether the a first cache page for caching data in an address to which the first data is to be written is present in the primary cache; and in response to determining that the first cache page is present in the primary cache, writing the first data to the first cache page.

17. The apparatus according to claim 16, wherein the acts further comprise:

in response to determining that the first cache page is absent from the primary cache, determining whether a second cache page for caching data in an address to which the first data is to be written is present in the secondary cache; and in response to determining that the second cache page is absent from the secondary cache, writing the first data into the at least one physical disk.

18. The apparatus according to claim 17, wherein the acts further comprise:

in response to determining that the second cache page is present in the secondary cache, invalidating the second cache page;

allocating, in the primary cache, a third cache page for caching data in the address to which the first data is to be written; and writing the first data into the third cache page.

19. The apparatus according to claim 13, wherein flushing the at least one cache page in the primary cache to the secondary cache comprises:

in response to the available capacity of the primary cache being below the predetermined threshold, determining, from the primary cache, the at least one cache page that does not need to be flushed to the at least one physical disk; and flushing the at least one cache page to the secondary cache.

20. The apparatus according to claim 12, wherein the acts further comprise:

in response to the secondary cache being created and second information about a second virtual disk in the storage system being received from the hardware management module, extending the secondary cache using the second virtual disk, wherein the plurality of extents further comprise a second group of extents for creating a second disk array, and the second virtual disk is created by the hardware management module based on at least one spare extent from the second group of extents, the at least one spare extent from the second group of extents being reserved for rebuilding the second disk array.

21. The apparatus according to claim 12, wherein the acts further comprise:

in response to the secondary cache being created and third information about a third virtual disk in the storage system being received from the hardware management module, extending the secondary cache using the third virtual disk, wherein the plurality of extents further comprise a third group of extents for extending the first disk array, and the third virtual disk is created by the hardware management module based on at least one spare extent from the third group of extents, the at least one spare extent from the third group of extents being reserved for rebuilding the extended first disk array.

22. The apparatus according to claim 12, wherein the acts further comprise:

in response to receiving, from the hardware management module, an indication that the first virtual disk fails, removing the first virtual disk from the secondary cache.

23. A computer program product having a non-transitory computer readable medium which stores a set of instructions to manage a cache; the set of instructions, when carried out by computerized circuitry, causing the computerized circuitry to perform a method of:

creating a primary cache by a cache management module in a storage system;

in response to the primary cache being created, sending a first request to a hardware management module in the storage system to obtain first information about a first virtual disk in the storage system, wherein the storage system comprises at least one physical disk having a plurality of extents, the plurality of extents comprise a first group of extents for creating a first disk array, and the first virtual disk is created by the hardware management module based on at least one spare extent from the first group of extents, the at least one spare extent from the first group of extents being reserved for rebuilding the first disk array;

in response to receiving the first information from the hardware management module, creating a secondary cache using the first virtual disk; and in response to an available capacity of the primary cache being below a predetermined threshold, flushing at least one cache page in the primary cache to the secondary cache.

\* \* \* \* \*